US012338642B2

(12) United States Patent
Reid

(10) Patent No.: US 12,338,642 B2
(45) Date of Patent: Jun. 24, 2025

(54) STORAGE APPARATUS AND ASSOCIATED METHODS

(71) Applicant: POOLPOD PRODUCTS LTD, Glasgow (GB)

(72) Inventor: Josh Reid, Glasgow (GB)

(73) Assignee: POOLPOD PRODUCTS LTD, Glasgow (GB)

(*) Notice: Subject to any disclaimer, the term of this patent is extended or adjusted under 35 U.S.C. 154(b) by 410 days.

(21) Appl. No.: 17/633,502

(22) PCT Filed: Jul. 31, 2020

(86) PCT No.: PCT/GB2020/051849
§ 371 (c)(1),
(2) Date: Feb. 7, 2022

(87) PCT Pub. No.: WO2021/023980
PCT Pub. Date: Feb. 11, 2021

(65) Prior Publication Data

US 2022/0290453 A1 Sep. 15, 2022

(30) Foreign Application Priority Data

Aug. 6, 2019 (GB) ..................................... 1911240

(51) Int. Cl.
*G07C 9/00* (2020.01)
*A47B 81/00* (2006.01)
(Continued)

(52) U.S. Cl.
CPC ........... *E04H 1/1266* (2013.01); *A47B 81/00* (2013.01); *G07C 9/00912* (2013.01); *G07C 9/20* (2020.01); *G07C 2209/62* (2013.01)

(58) Field of Classification Search
CPC ............ G07C 9/00912; G07C 9/00896; G07C 9/00309; G07C 9/00571; G07F 17/12; E05G 5/003; A47B 81/00
See application file for complete search history.

(56) References Cited

U.S. PATENT DOCUMENTS 3,948,067 A * 4/1976 Peterson ................. E05C 7/002 70/263
5,694,867 A * 12/1997 Diaz-Lopez ............ E05G 5/003 109/6
(Continued)

FOREIGN PATENT DOCUMENTS

CN 103015819 A 4/2013
JP 2006138150 A 6/2006
(Continued)

OTHER PUBLICATIONS

International Search Report and Written Opinion for PCT Application No. PCT/GB2020/051849, mailed Oct. 15, 2020, 11 pages.

*Primary Examiner* — Brian E Glessner
*Assistant Examiner* — Daniel J Kenny
(74) *Attorney, Agent, or Firm* — DILWORTH IP, LLC

(57) ABSTRACT

A changing area storage locker with at least a first door and a second door. The locker has a storage cavity accessible via the first door or the second door. At least one locking system is provided for locking one or both of the first and second doors. The locking system is configured to prohibit access to the storage cavity via the first and second doors simultaneously.

18 Claims, 8 Drawing Sheets

(51) Int. Cl.
*E04H 1/12* (2006.01)
*G07C 9/20* (2020.01)

(56) References Cited

U.S. PATENT DOCUMENTS

| | | | | |
|---|---|---|---|---|
| 8,725,600 | B2 * | 5/2014 | Levy | A47B 81/00 312/109 |
| 10,460,539 | B2 * | 10/2019 | Zielkowski | A45F 3/02 |
| 10,474,797 | B2 * | 11/2019 | Lowenthal | G07F 9/001 |
| 10,607,433 | B2 * | 3/2020 | Danson | G07C 9/00571 |
| 2014/0316918 | A1 * | 10/2014 | Zaniker | G06Q 20/347 705/21 |
| 2019/0147681 | A1 | 5/2019 | Danson | |

FOREIGN PATENT DOCUMENTS

| | | | |
|---|---|---|---|
| KR | 20160057698 | A | 5/2016 |
| WO | 2012034171 | A1 | 3/2012 |

* cited by examiner

Fig. 1
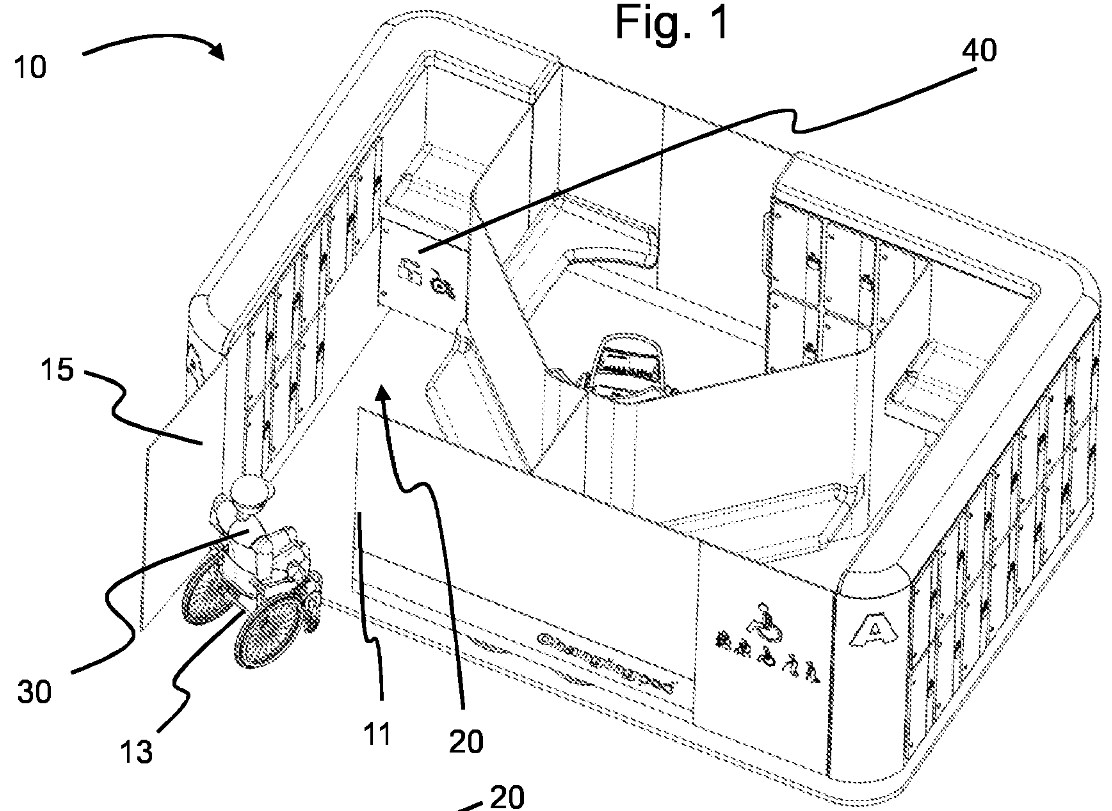
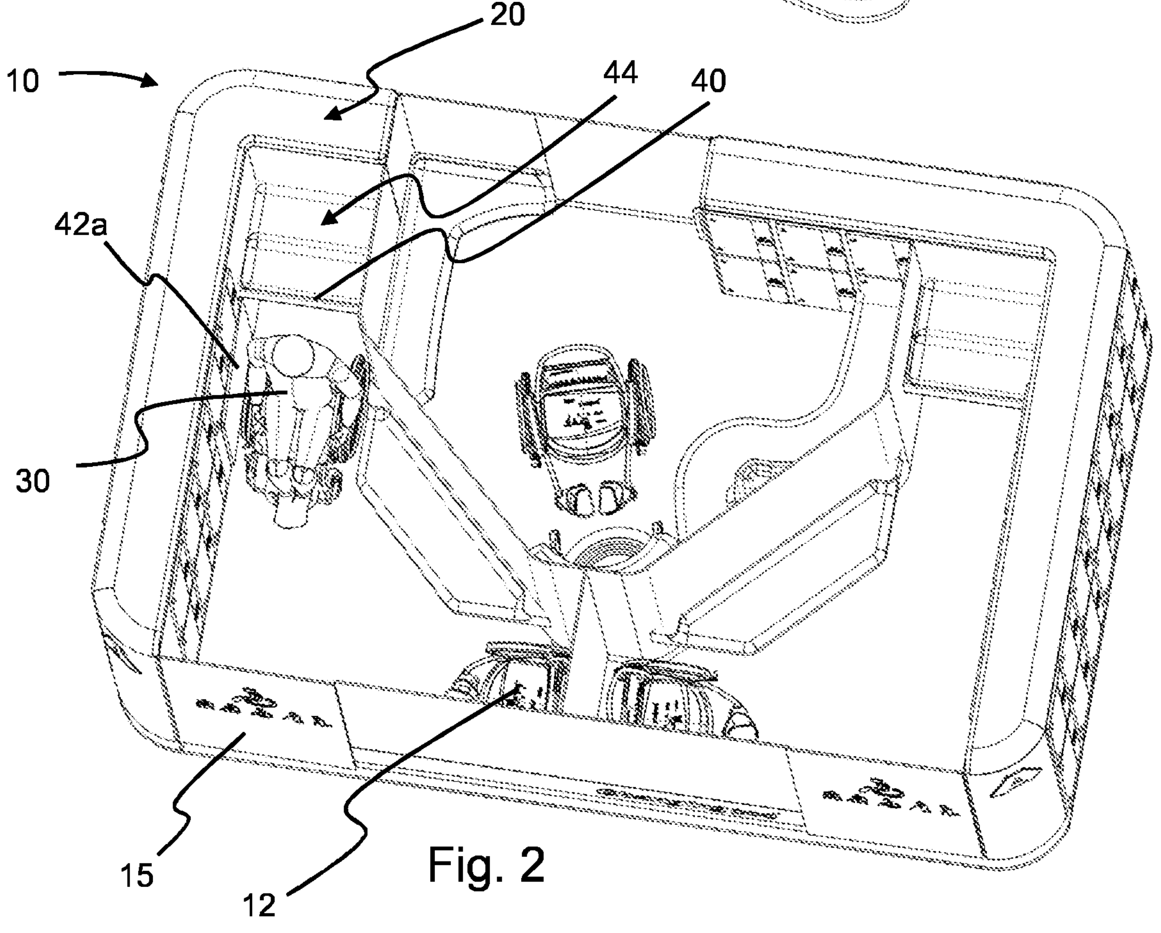
Fig. 2

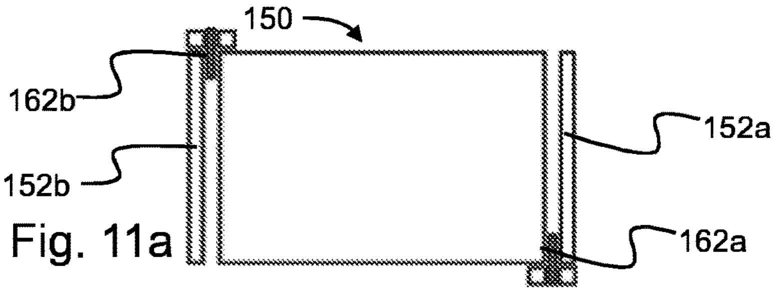
Fig. 11a
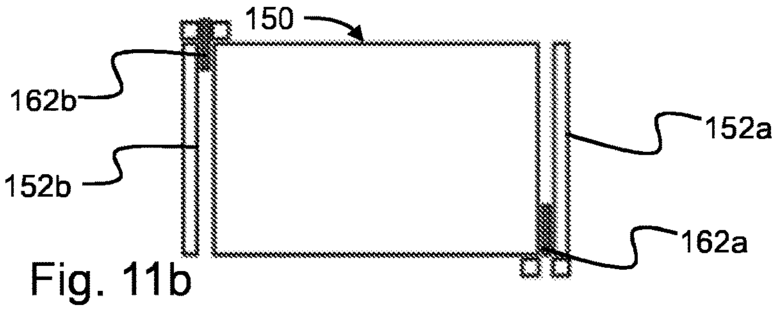
Fig. 11b
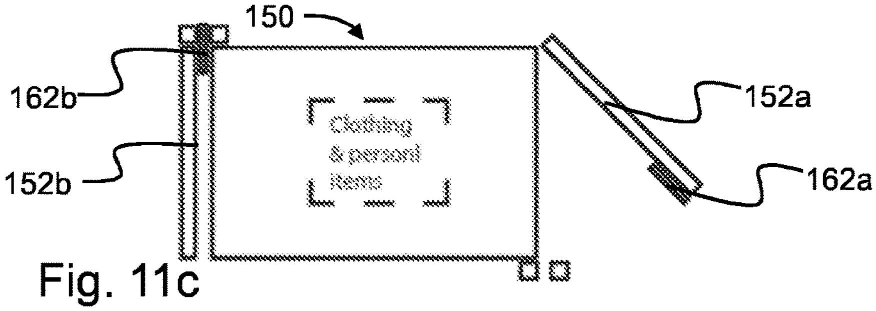
Fig. 11c
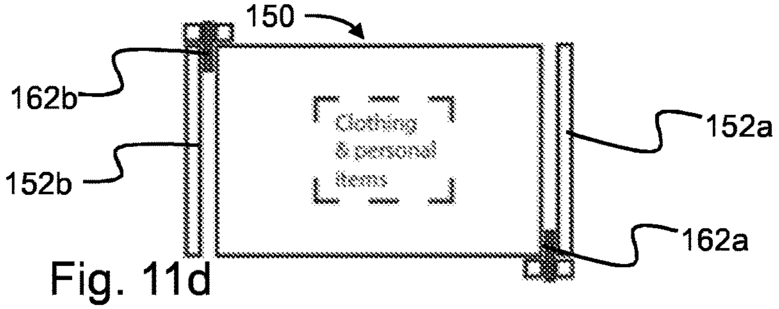
Fig. 11d
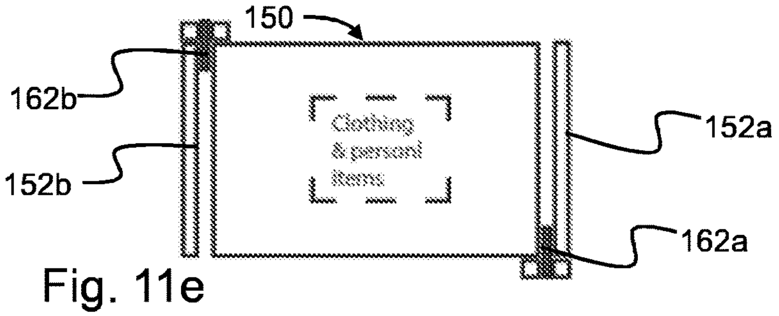
Fig. 11e
Fig. 11
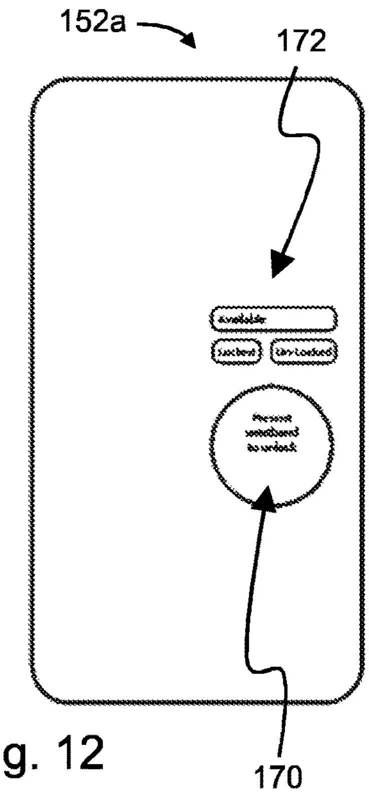
Fig. 12

STORAGE APPARATUS AND ASSOCIATED METHODS

CROSS-REFERENCE TO RELATED APPLICATIONS

The present application is a national phase application of International Patent Application No. PCT/GB2020/051849, filed on Jul. 31, 2020, which claims priority to Great Britain Patent Application No. 1911240.8, filed on Aug. 6, 2019, entitled "STORAGE APPARATUS AND ASSOCIATED METHODS," the disclosures of which are hereby incorporated by reference in their entireties.

TECHNICAL FIELD

This disclosure concerns a storage apparatus and associated methods/apparatus. For example, the disclosure concerns storage lockers, such as in changing areas. In particular, but not exclusively, examples of the disclosure concern storage lockers accessible via a plurality of doors.

BACKGROUND

Communal facilities, such as sports centres and swimming pools, often have changing facilities for users to change their clothing. Users often travel to such facilities in everyday clothing and then change into activity clothing, such as a swimming costume or other sports attire. Accordingly, changing rooms or areas are provided for the users to change their clothing before and/or after performing activities. Sometimes the changing rooms are communal changing areas, often segregated into male/female changing areas, where users can change their clothes (i.e. dress/undress). Other facilities provide changing rooms with individual, family or group changing areas. Such changing rooms typically have a plurality of booths, cubicles or chambers to allow multiple individuals/families and/or groups to change simultaneously.

Storage lockers are typically provided for the users to store their apparel, such as their everyday clothing or belongings, whilst they are performing their activities at the facilities. For example, swimmers visiting a swimming pool typically enter a changing area to undress from their everyday clothes to put on their swimming costume; and then store their everyday clothes in a locker until they have finished swimming. Once they have finished swimming, they return to their locker, possibly after showering, to retrieve their clothes and maybe also a towel. They can then proceed to change from their swimming costume back to their everyday clothes in an available changing area.

Storage lockers are derived from their locking functionality, to provide security of the contents whilst the user is absent. Different lockers have different locking mechanisms, such as with mechanical keys or electronic tags which can be carried by the users whilst away from the lockers; or pin codes or other electronic locking means to allow only authorised users to lock and unlock specific lockers.

SUMMARY

According to a first aspect there is provided an apparatus for storing apparel, such as a user's items. The apparatus may comprise a locker. The locker may comprise a storage locker. The locker may comprise a changing area storage locker. The locker may comprise a sports facility storage locker. The locker may comprise a wheelchair locker for storing a wheelchair. The locker may comprise a buggy locker for storing a buggy, pram, stroller or the like. The locker may be configured to store a wheelchair or a buggy, pram, stroller or the like. For example, the locker may be sized and dimensioned to receive at least one of either a wheelchair or a stroller.

The locker may comprise a first door. The locker may comprise a second door. The locker may comprise a storage cavity. The storage cavity may be accessible via the first door. The storage cavity may be accessible via the second door. The storage cavity may be accessible via the first door and the second door. In at least some examples, the storage cavity may be accessible via at least the first door and the second door. The storage cavity may be accessible via only a single door at any time. The storage cavity may not be accessible by two or more doors simultaneously.

The storage cavity may be defined by at least one locker wall. In at least some examples, the storage cavity is defined by a pair of locker walls, the first door and the second door, and a locker top and a locker bottom. The first door and the second door may be opposing. The storage cavity may be defined between the first and second doors. The pair of locker walls may be opposing. The pair of locker walls may each comprise a side wall, such as a left side wall and a right side wall respectively. The storage cavity may be defined between the pair of side walls, between the pair of opposing doors and between the locker top and locker bottom.

The first door may provide access to the storage cavity from a first direction. The second door may provide access to the storage cavity from a second direction. The first and second directions may be opposing. For example, the first door may provide axis via a first end direction, along a central longitudinal, optionally horizontal, axis of the locker, with the second door providing access in an opposite direction along the axis (e.g. towards the first door). In at least some examples, the first and second directions may be divergent or convergent, such as oblique. The first and second directions may be laterally arranged, such as where the first and second doors provide lateral, such as perpendicular, access to the storage cavity—relative to each other. For example, the locker may comprise a side locker in a changing area, such as a changing cubicle or booth, with one of the first and second doors providing access from within the changing area; and the other of the first and second doors providing access from outside the changing area, such as via a locker door in a side wall. One of the first and second doors may provide access from a front of the locker; and the other of the first and second doors may provide access from a side and/or back of the locker.

In some examples, the first and second directions may be the same, or at least parallel. For example, the first and second doors may each be provided in a same plane or face of the locker, such as the front of the locker. The first and second doors may be separated, such as by a divider. The divider may comprise a partition or wall of the changing area, such as a cubicle wall.

The locker may span a boundary of the changing area. The locker may at least partially define a boundary of the changing area.

The locker may comprise at least one locking system for locking at least one of the first and second doors. The locking system may be for one or both of the first and second doors. The locking system may be configured to prohibit access to the storage cavity via the first and second doors simultaneously. A locked door may comprise a locked closed door. In at least some examples, the first and/or second door/s may be lockable only in a closed position. The locking system may be configured to prevent locking of the door/s when the door/s is/are not closed, or not closed properly.

The storage cavity may be accessible via either of the first or second doors when they are unlocked. The storage cavity may be securable via one or both of the first and second doors when they are locked. The locking system may be configured to operate such that if the first door is unlocked, the second door is or remains locked; and if the second door is unlocked, the first door is or remains locked.

The locking system may be configured to selectively vary the first and second doors between respective states. The state may comprise a configuration. The state may comprise an operative state. The locker may be reconfigurable between only a limited number of states, at least when in normal use. The locking system may be configured to selectively vary the state by operation by a single user. The locking system may be configured to selectively vary the state between three respective states, wherein:

i. the first and second doors are locked;

ii. the first door is unlocked and the second door is locked; or iii. the first door is locked and the second door is unlocked The states may be variable in any order. Alternatively, the states may be variable only in a fixed order, such as i, then ii, then iii as listed above. The states may be infinitely variable, such as infinitely cyclable between states. The states may be variable only by a single user. The states maybe variable only by a single, authorised user, such as the user in possession of a key or other access means for operating the locking system.

In at least some examples, the locking system may be configured to vary a status of at least one of a lock, door or locker between: locked & openable by an authorised user; and locked & openable by any user. In such examples, the locker may be toggled between three statuses: the two respective "locked" statuses and an "open" status. An indicator may be provided to indicate at least two of those statuses (e.g. "available" for "locked & openable by any user"; and "unavailable" for "open" and also "locked & openable by an authorised user only").

The locker may comprise a default state. The default state may comprise an initial state, such as prior to use by any user. In at least some examples, the locker may be only openable from the default state via one of the first and second doors. The one of the first and second doors may be predefined. The one of the first and second doors openable from the default state may be selected, such as automatically by a central management system. The default state of the locker, such as whether or which of the first and second doors is respectively locked and unlocked in the default state, may be determined in dependence on a parameter/s. The parameter/s may include one or more of: a time of day; a time in relation to an activity or planned activity; a status of one or more other locker/s, such as those accessible from a same cubicle.

The locker may be reconfigurable between states by a user action and/or an authorised user action and/or by a management control (such as a central electronic control system and/or a management staff/personnel).

The locker may be configured or reconfigured to the default state. The locker may be reconfigurable to the default state by user operation. For example, the locker may be reconfigurable to the default state by the user completing use of the lock. The locker may be reconfigurable to the default state automatically. For example, the locker may be configured, such as programmed, to return to the default state after a period of time, such as a predetermined period of inactivity. The locker door/s may be biased closed, or at least automatically closeable, such as to enable automatic and/or remote reconfiguration of the locker (e.g. by changing a state of the lock/s).

The locking system may comprise at least one mechanical lock. Additionally, or alternatively, the locking system may comprise at least one electromagnetic lock. The locking system may comprise one or more of: mechanical keys or electronic tags such as can be carried by the user whilst away from the locker; a pin code/s; other electronic and/or mechanical locking means. The locking system may be configured to allow only authorised users to lock and unlock specific lockers; such as only a single user to lock and/or unlock a locker. The locking system may comprise a computer or other electronic management control system. The locking system may be operable keylessly. The locking system may be operable by a user via an electronic interface. In at least some examples, the locking system may comprise an electronic input device, such as a keypad, touchscreen or the like. In at least some examples a discrete electronic interface may be associated with each locker, optionally with each locker door. Accordingly, in at least some examples, each locker may comprise a pair of electronic interfaces. Additionally, or alternatively, a single electronic interface may be configured to operate a plurality of locker doors, optionally a plurality of lockers. For example, a single electronic interface may be accessible to operate a group or cluster of lockers proximal to the interface. The electronic interface may allow a user to input an identifier or code to operate the locker. In at least some examples, the user may be provided with an identifier or code to operate a particular or designated locker, such as for a limited period or sequence of operation. Additionally, or alternatively, the user may select or programme an identifier or code, such as for use with a particular or designated locker. The electronic management control system may be networked, such as locally linked to a plurality of lockers and/or the central management control system.

The first door, when open, may provide access to the storage cavity via a first opening, such as a first doorway. The second door, when open, may provide access to the storage cavity via a second opening, such as a second doorway. The first opening may be discrete from the second opening.

The locker may be configured to prevent viewing into the locker when the first and second doors are closed. The locker may be configured to prevent viewing through the locker, such as to prevent viewing into the changing area.

The locker may comprise an indicator to indicate whether at least one of the locker doors is unlocked. The indicator may comprise a visual indicator, such as to visually indicate to a user in the changing area whether at least one of the locker doors is unlocked. The indicator may comprise a mechanical indicator. Additionally, or alternatively, the indicator may comprise an electronic indicator. In at least some examples, the indicator may be configured to alert the locker user and optionally an additional person, such as an authorised member of staff or supervisor. The indicator may be coupled to the locking system. In at least some examples, the locking system comprises a latch. The latch may provide a visual indication of engagement. The first and/or second door/s may be biased. For example, the first door and the second door may both be spring-loaded to close when not held open. The biasing force may be sufficient to engage a portion of the locking system, such as a mechanical latch. At least one of the first and second doors may be biased open.

For example, each of the inner doors on a cubicle-side of the lockers may be biased open when unlocked. Accordingly, a visual indicator that all of the lockers or at least inner locker doors is locked can be provided by an absence of open locker doors. A user may be reassured by an absence of open locker doors that all of the lockers are locked, such as when wishing to disrobe in the cubicle.

The locking system may be configured to operate to individually lock or unlock each of the first and second doors.

The locker may further comprise a second locking system. The aforementioned at least one locking system may be a first locking system, the first locking system operating to lock or unlock the first door. The second locking system may operate to lock or unlock the second door.

The locker may comprise a divider between the first and second doors. In use, the divider may conceal an outside of the first door from a user accessing the storage cavity via the second door. The divider may conceal an outside of the second door from a user accessing the storage cavity via the first door.

In at least some examples, one or more parts of the locker may be insulated, such as to reduce transmission of sound. For example, the locker door, particularly the inner, cubicle-side door, may be configured to reduce transmission of sound. Accordingly, a user in the cubicle may experience at least a sense of enhanced privacy, whereby sounds of another user accessing a locker cavity from outside the cubicle are not intrusive. At least part of the locker may be sealed. For example, the locker door/s may comprise a sealing portion, for sealing the locker door closed. The locker may be configured to prevent a physical object being passed into or out of the cubicle via the locker, such as through or around a closed locker door. In at least some examples, the inner locker door may comprise a sealing portion, the sealing portion at least assisting in reducing transmissibility into and/or out of the cubicle of sound and/or physical objects. The sealing portion may assist in preventing viewing into and/or out of the cubicle.

According to a further aspect there is provided an array of the lockers of any other aspect, example, embodiment or claim. The array may be configured to visually indicate whether any of the plurality of first locker doors and/or any of the plurality of the second locker doors is or can be unlocked. At least one of the pluralities of first or second doors may face in a similar orientation, such as towards a same changing area. For example, a first group of lockers may each comprise a first door accessible from within a first changing area; and each comprise a second locker door accessible from outside the changing area (when permitted).

According to a further aspect there are provided at least some examples of a facility, such as a changing facility, comprising the apparatus, such as the storage locker/s, or array/s thereof, of any other aspect, example, embodiment or claim. The changing facility may comprise a first changing area; wherein the first door of the locker is accessible from the first changing area, and the second door of the locker is accessible from outside the first changing area. In at least some examples, the second door may be accessible from a second changing area. The first changing area may comprise a wet changing area. The second changing area may comprise a dry changing area.

According to a further example, there is provided a method of accessing an apparatus, such as the storage locker of any other aspect, embodiment, example or claim. The method may comprise a method of accessing the storage cavity thereof. The method may comprise selectively accessing the storage cavity via only a single door or opening of the storage locker, whilst at least one other door or opening of the storage locker is closed. The method may comprise preventing a simultaneous opening of at least two locker doors. The method may comprise preventing access to the storage cavity of the locker from outside the changing area associated with the locker whilst a user within the changing area is accessing the locker. The method may comprise permitting access to the locker by a single user. The method may comprise permitting access via a single first door of an array of such lockers. The array of lockers may all comprise first doors on a same side or orientation, such as all located or directed towards the changing area. The method may comprise permitting access via a plurality of second locker doors of such an array. For example, the method may comprise a plurality of users outside the changing area each accessing a respective locker via a respective second locker door, optionally simultaneously accessing. The method may comprise permitting access to lockers from within the changing area only whilst those lockers are inaccessible, such as not unlockable, from outside the changing area. The method may comprise prohibiting access to lockers from outside the changing area whilst those lockers are accessible, such as unlocked and/or unlockable, from within the changing area. The method may comprise prohibiting simultaneous access to a same locker by two different users. The method may comprise prohibiting simultaneous access to a same locker by both the first and second doors by a single user. The method may comprise prohibiting simultaneous access to a same locker from within and outside the changing area. The method may comprise permitting access to lockers from outside the changing area only whilst those lockers are inaccessible, such as not unlockable, from inside the changing area.

The method may comprise changing a state or configuration of a locker/s by a user action and/or automatically. The method may comprise changing the state of the locker after a period of time. The method may comprise changing the state of the locker to a default state. The method may comprise defaulting the locker/s to provide access, at least initial access, from a preferred side only. The preferred side may comprise a side within the cubicle. Alternatively, the preferred side may comprise from outside the cubicle. The preferred side may be variable, such as with a time of day and/or use of a facility. For example, where a system detects a high usage rate, the preferred side for default access may be varied accordingly. In this way, the management system can assist in directing users to a most efficient locker and/or cubicle/s.

According to a further aspect there is provided a method of manufacturing an apparatus, such as a storage locker according to any other aspect, embodiment, example or claim.

The method may comprise additive printing, 3D printing. The method may comprise transferring manufacturing instructions, such as to or from a computer (e.g. vie internet, e-mail, file transfer, web or the like). In at least some examples, the method may comprise printing at least some of the components of the apparatus. For example, the method may comprise printing any or all of the components of the storage locker (and optionally 3D printed lock component/s). The components or apparatus may be supplied in a final-use configuration.

Another aspect of the present disclosure provides a computer program comprising instructions arranged, when executed, to implement a method in accordance with any other aspect, example or embodiment. A further aspect provides machine-readable storage storing such a program.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the apparatus of one aspect may comprise features of any other aspect). Optional features as recited in respect of a method may be additionally applicable to an apparatus or device; and vice versa. The apparatus or device of one aspect, example, embodiment or claim may be configured to perform a feature of a method of any aspect, example, embodiment or claim. In addition, corresponding means for performing one or more of the discussed functions are also within the present disclosure.

It will be appreciated that one or more embodiments/aspects may be useful in at least storing a user's items.

The above summary is intended to be merely exemplary and non-limiting.

Various respective aspects and features of the present disclosure are defined in the appended claims.

It may be an aim of certain embodiments of the present disclosure to solve, mitigate or obviate, at least partly, at least one of the problems and/or disadvantages associated with the prior art. Certain embodiments or examples may aim to provide at least one of the advantages described herein.

BRIEF DESCRIPTION OF THE DRAWINGS

These and other aspects of the present invention will now be described, by way of example only, with reference to the accompanying drawings, in which:

FIG. 1 is a isometric view of a plurality of changing cubicles in an aquatic sports facility wherein multiple storage lockers may be accessed from within the cubicle, showing a user approaching the cubicle entrance;

FIG. 2 is a isometric view showing the user inside one of the FIG. 1 changing cubicles;

FIGS. 11*a* to 11*e* show a sequence of an operation of a locker in chronological order;

FIG. 12 shows a door of the locker of FIGS. 11*a* to 11*e* with a locker interface and an indicator panel;

DETAILED DESCRIPTION

Figure 3:
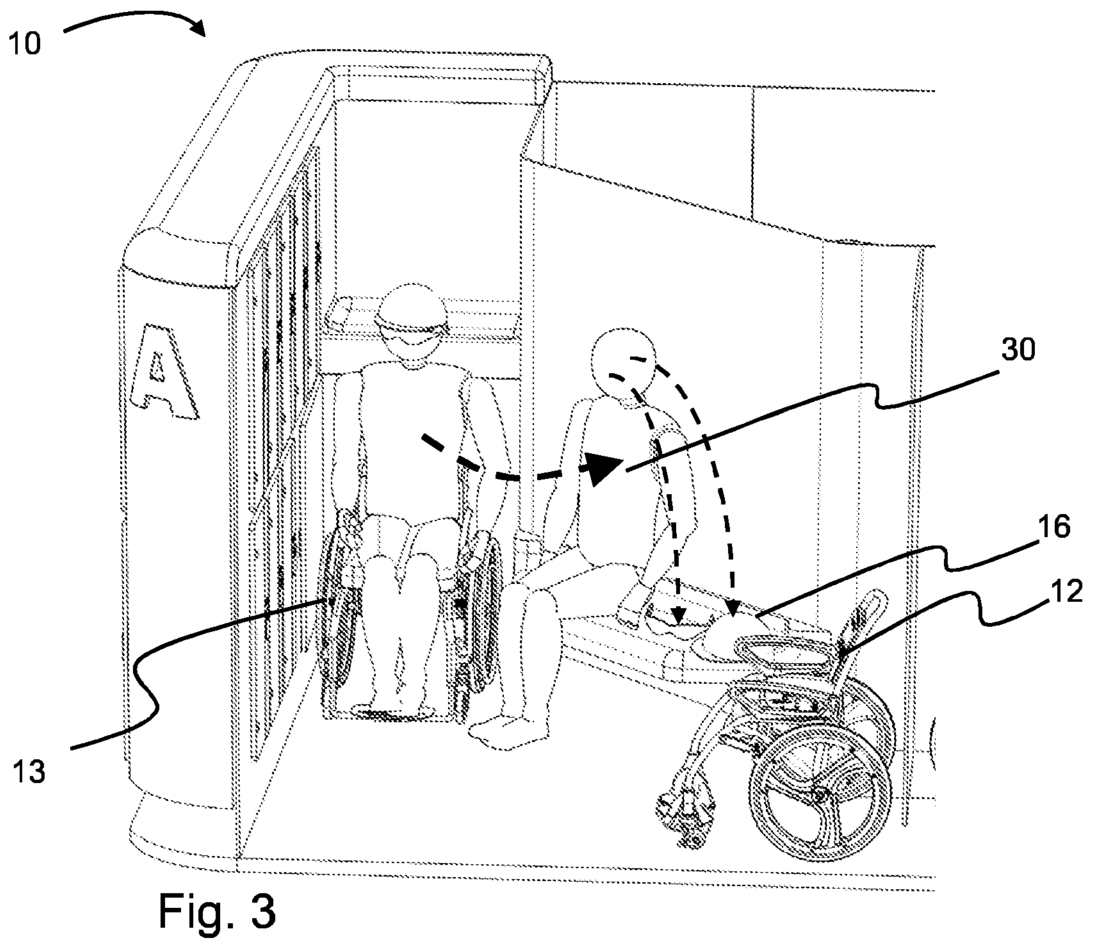
FIG. 3 is a cutaway isometric view of a FIG. 1 changing cubicle (with a front-wall represented as transparent), which shows the user transferring from a standard wheelchair to a changing bench within the cubicle.

Changing area storage lockers are present in many venues, including at aquatic sports facilities. However, they are not always accessible by their users when required. This applies especially to wheelchair users, who may be restricted in the number of lockers that they can readily access.

In the following detailed example, a plurality of changing area storage lockers are located at an aquatic sports facility. Each locker has two doors, with a first door being accessible by a user inside a changing cubicle and/or a dry changing area, and the second door being accessible by a user beside a swimming pool and/or inside a wet changing area. Only one door of the locker can be open or unlocked at any instant, such that the first and second doors can never be open or unlocked together.

Each storage locker comprises a locking system for selectively locking either, or both of the first and second doors. The locking system operates such that if the first locker door is unlocked, the second locker door is or remains locked; and if the second locker door is unlocked, the first locker door is or remains locked. A storage cavity is defined between the first and second locker doors, which is accessible via either door if unlocked, and securable via either or both doors if locked.

FIG. 1 shows the changing cubicle 10 in the aquatic sports facility wherein multiple storage lockers 20 may be accessed from within the cubicle 10. The user 30 approaches the cubicle entrance 11. The cubicle 10 contains a sports wheelchair 12 (seen in FIG. 2), which in this example is an aquatic wheelchair. The user 30 enters the cubicle 10 whilst using a standard wheelchair 13.

Once the user 30 is inside the cubicle 10, a main cubicle door 15 is closed for privacy, and the user 30 manoeuvres into a transfer space. FIG. 2 shows the user 30 proximal to, and facing away from, one of the storage lockers 20, which in this instance is a wheelchair locker 40. The wheelchair locker 40 has a first door being a cubicle-side door 42*a*, and a second door being a pool-side door (shown in FIG. 8).

In FIG. 2, the cubicle-side door 42*a* of the wheelchair locker 40 has been opened by the user 30, whilst the pool-side door is and remains closed, because only one door of the locker 40 can be open at any instant. This helps the user 30 to access the locker's storage cavity 44 whilst maintaining their privacy inside the changing cubicle 10.

Figure 4:
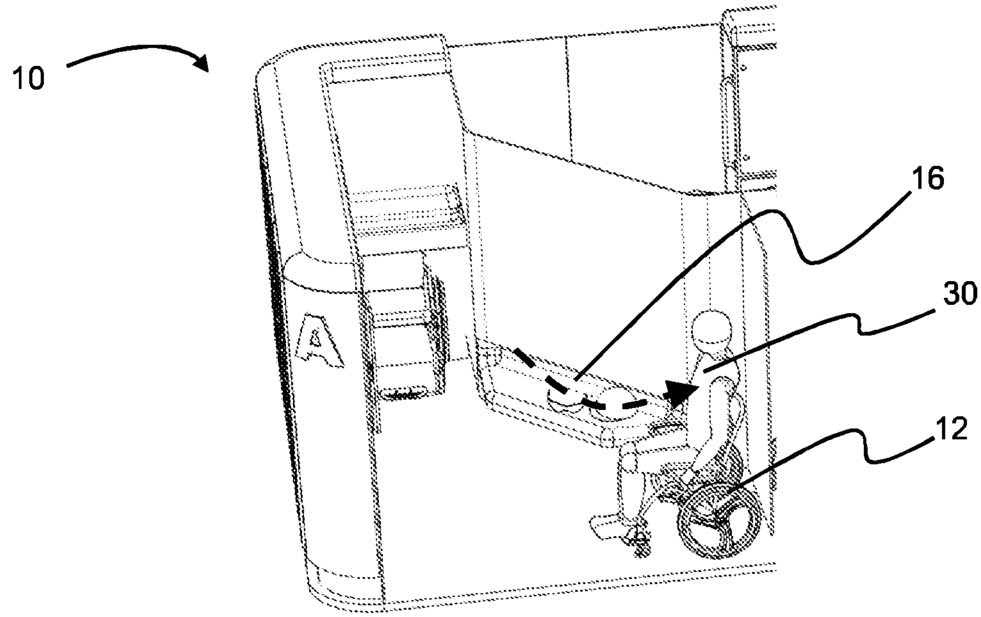
FIG. 4 is a cutaway isometric view showing the user subsequently transferring from the changing bench to a sports wheelchair.

FIG. 3 shows the user 30 transferring from the standard wheelchair 13 to a changing bench 16 within the cubicle 10 where they can conveniently remove their outdoor items of apparel. Subsequently, the user 30 transfers from the changing bench 16 to the aquatic wheelchair 12, as shown in FIG. 4.

Figure 5:
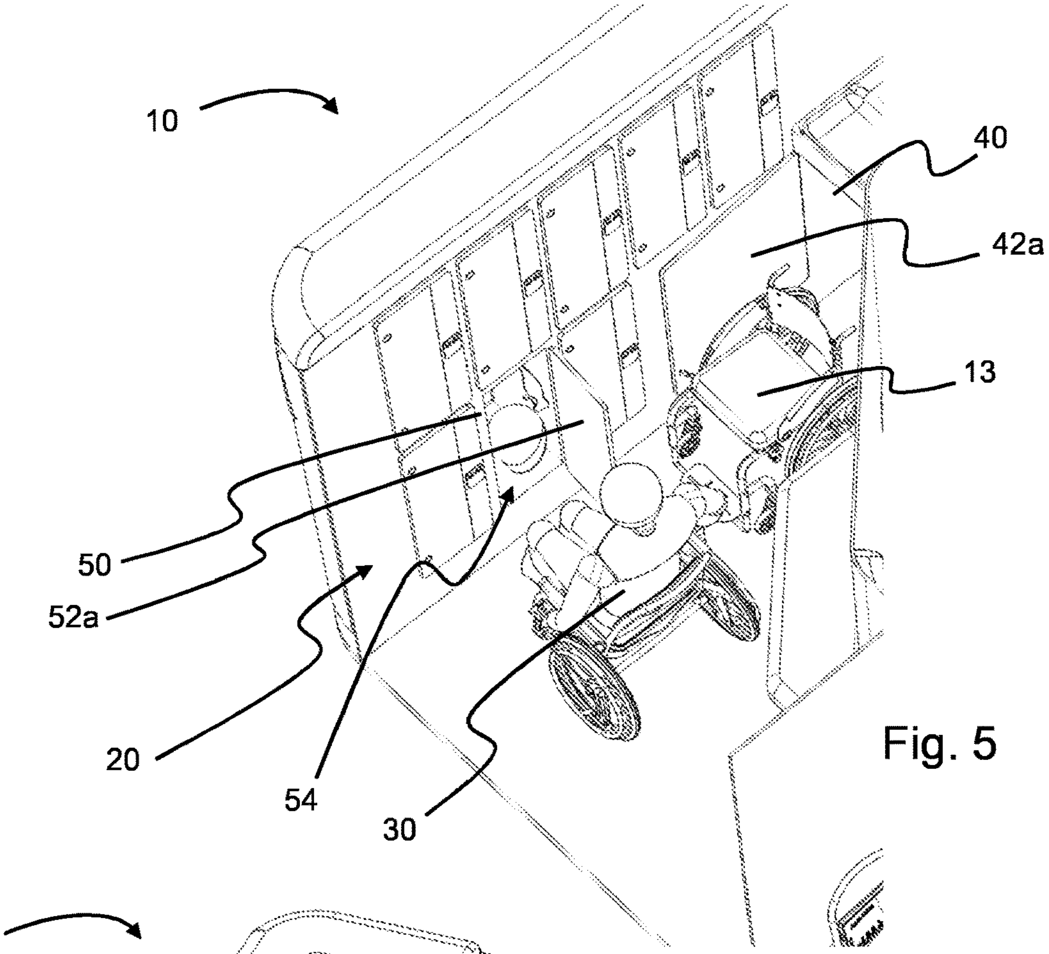
FIG. 5 is a cutaway isometric view showing the user having opened the cubicle-side door of a storage locker for storing apparel, and the cubicle-side door of a storage locker for storing their standard wheelchair.

A further locker 20 is then accessed by the user, as shown in FIG. 5, which in this instance is an apparel locker 50. Similarly with the wheelchair locker 40, the apparel locker 50 has a first door being a cubicle-side door 52*a*, and a second door being a pool-side door (shown in FIG. 7). It will be appreciated that in other examples the second door may comprise a different cubicle-side door (e.g. located in a different, second cubicle) or a non-pool-side door, such as where the second door 52*b* is in a dry area, and/or a post-activity changing area. The cubicle-side door 52*a* of the apparel locker 50 has been opened by the user 30, whilst the pool-side door is and remains closed, because only one door of the locker 50 can be open at any instant. This helps the user 30 to access the locker's storage cavity 54 whilst maintaining their privacy inside the changing cubicle 10.

Figure 6:
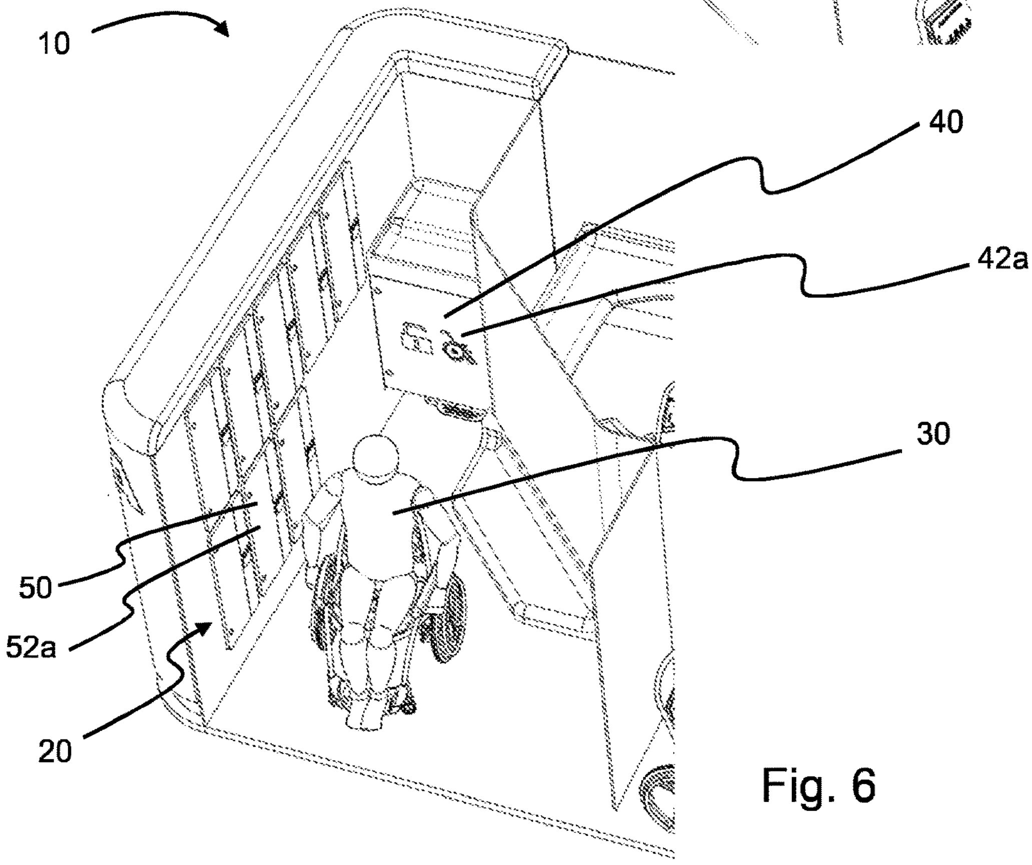
FIG. 6 is a cutaway isometric view showing the respective storage lockers after the user has closed their doors.

The user 30 then places their items into the apparel locker 50, and closes the cubicle-side door 52*a*. The standard wheelchair 13 is pushed inside the wheelchair locker 40 which is then also closed at the cubicle-side door 42*a*. This is shown in FIG. 6. After closure, the cubicle-side door of each locker 42*a*, 52*a* is locked. The locking system may operate mechanically through the use of a removable, user-carriable key, and/or electronically/electromagnetically through the entry of a unique pin code by the user, or a removable, user-carriable RFID tag or fob.

The user 30 then exits the changing cubicle 10 and proceeds to use the venue's facilities, such as sports facilities or equipment, which includes a swimming pool in this example. When the user 30 returns to the changing cubicle 10, it is possible that the changing area 10 will be occupied by another user. This is especially likely at peak venue-usage times. The user is temporarily unable to access their apparel and belongings, such as their clothes and wheelchair 13, from the locker(s) 40, 50 via the same door(s) 42*a*, 52*a* through which these items were initially fed for storage.

Figure 7:
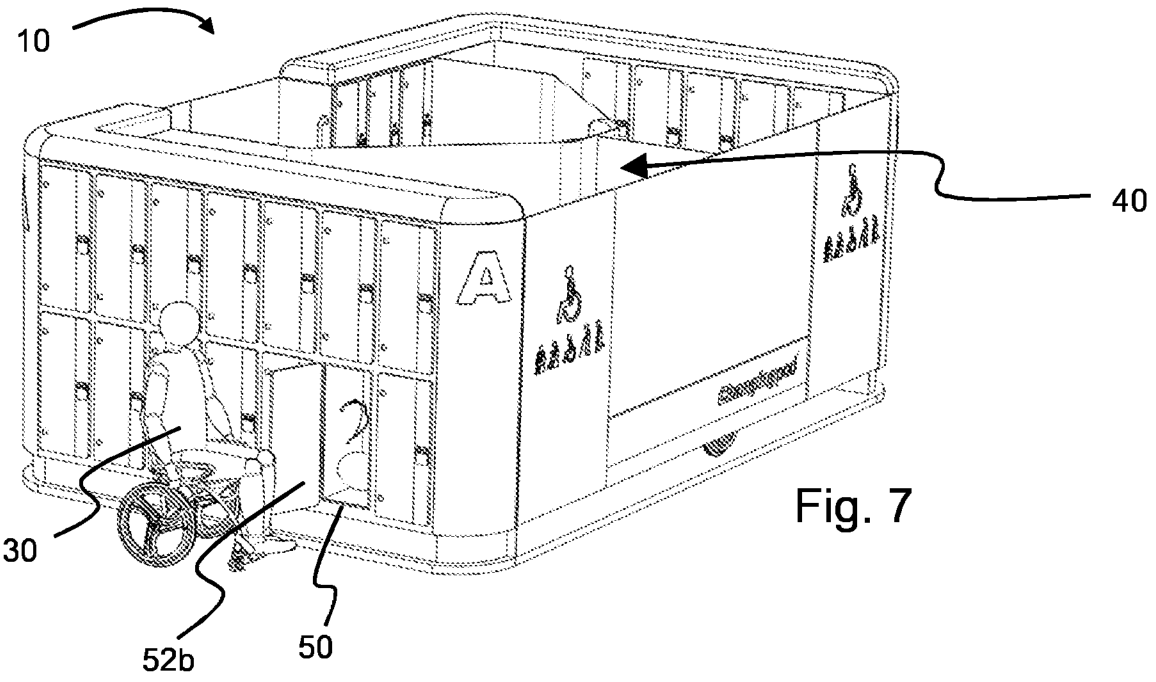
FIG. 7 is a isometric view of the changing cubicle which shows the user returning to the cubicle and accessing the apparel locker from a different, pool-side locker door.
Figure 8:
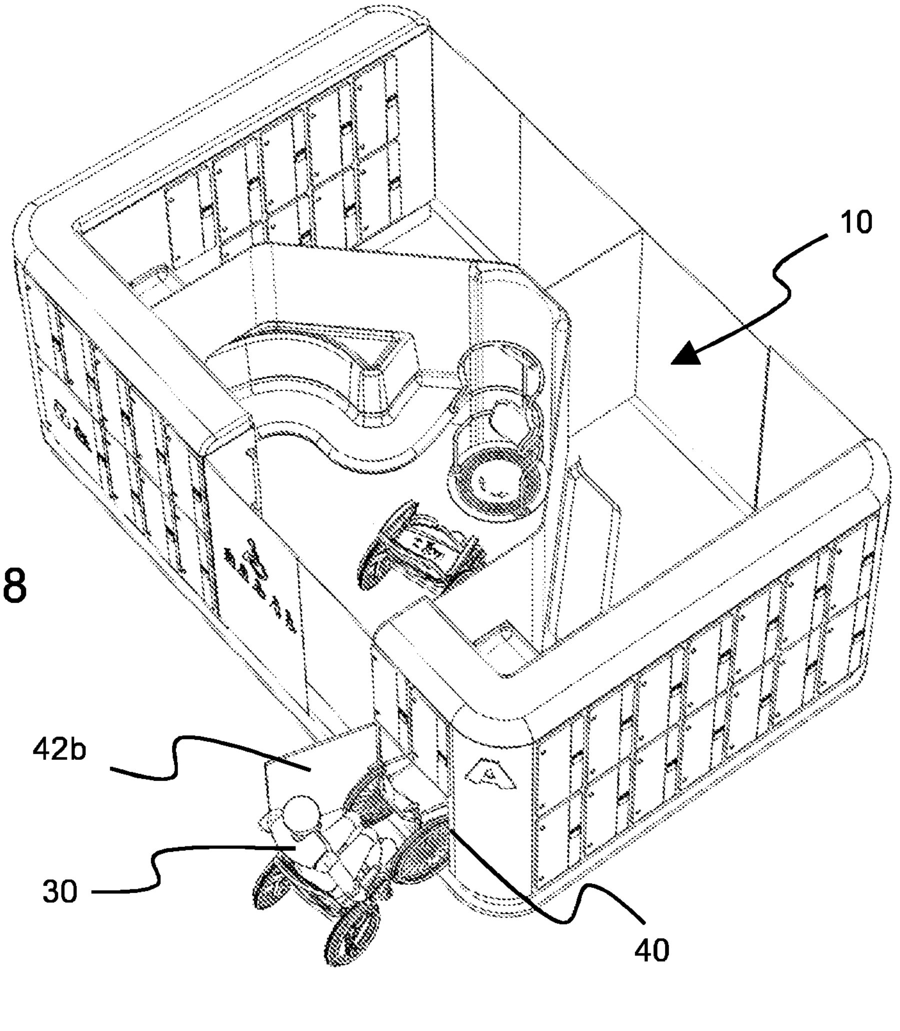
FIG. 8 is a further isometric view showing the user accessing the wheelchair locker from a different, pool-side locker door.

In situations such as these, the user 30 can optionally gain access to the apparel locker 50 from the pool-side via the pool-side apparel locker door 52*b*, and they can similarly gain access to the wheelchair locker 40 from the pool-side wheelchair locker door 42*b*. FIG. 7 shows the apparel locker 50 being accessed from its pool-side door 52*b*, and FIG. 8 shows the wheelchair locker 40 being accessed from its pool-side door 42*b*. The user 30 need not wait until the changing cubicle 10 is free to access and retrieve their items such as apparel and wheelchair 13 from their locker(s) 40, 50. For example, the user 30 can take their items to another cubicle if vacant—or take their belongings to leave the facility (e.g. if they do not wish to change back into their original clothing).

Figure 9:
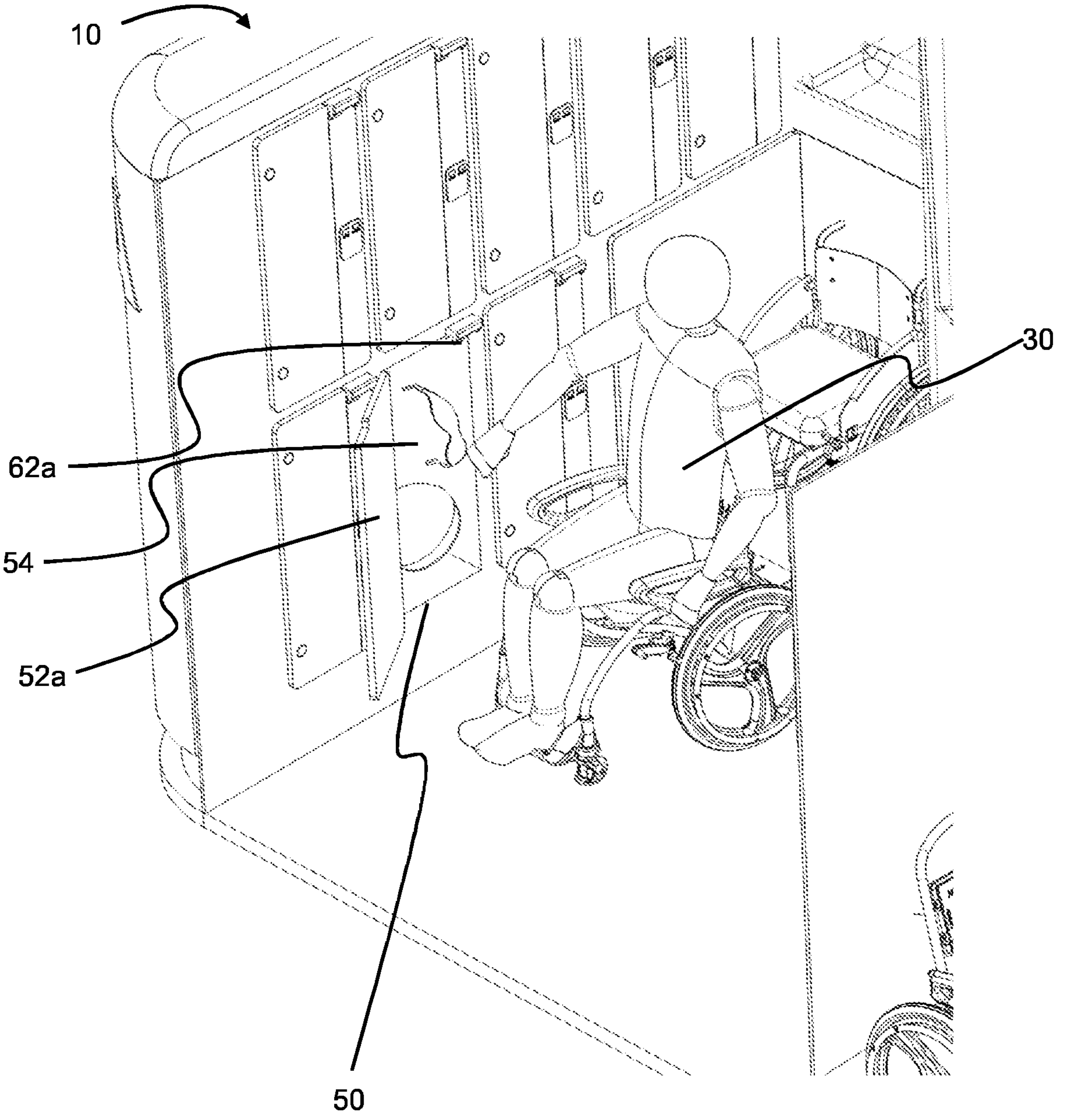
FIG. 9 shows an alternative configuration of the storage lockers depicted in the previous drawings, wherein there is a privacy latch at the cubicle-side door, and wherein the cubicle-side door of an apparel locker is open.

FIG. 9 shows an alternative configuration of the previously described apparel locker 50 wherein there is a privacy latch 62*a* for engaging the cubicle-side locker door 52*a*. The privacy latch 62*a* is provided in addition to the aforedescribed locking system. The privacy latch 62*a* prevents the cubicle-side locker door 52*a* from being opened when the latch 62*a* is engaged, and can be disengaged by the user 30 from inside the cubicle 10 to allow the locker door 52*a* to be opened (as described above however, the cubicle-side door 52*a* cannot be opened if the pool-side door of the locker is open or unlocked). Notably, the latch 62*a* is not accessible from the locker storage cavity 54 and/or the pool-side door 52*b* (seen in FIG. 7). Accordingly, the latch 62*a* helps prevent visibility into the cubicle 10 from outside the cubicle 10. The latch 62*a* serves as a visual indicator to the user 30 as to whether the cubicle-side locker door 52*a* is currently openable or not. For example, the distinctive visual indicator (e.g. colour contrast) provided by the latches 62*a* can alert the user to any unlocked locker doors 52*a*; and reassure the user 30 that no locker door 52*a* can unexpectedly open whilst they are in the cubicle 10.

Figure 10:
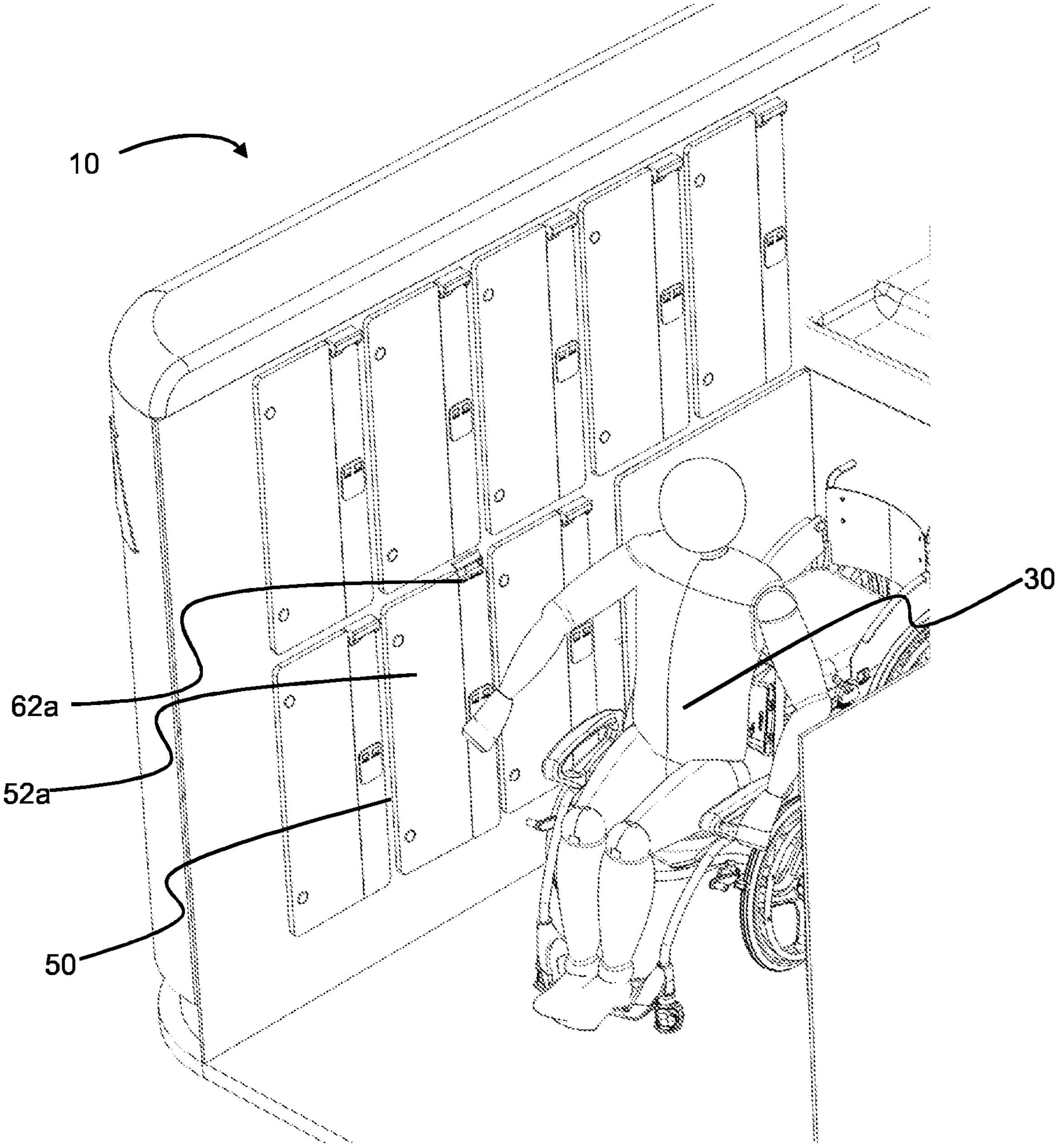
FIG. 10 shows the locker with the configuration of FIG. 9, wherein the cubicle-side door of the apparel locker is being closed by the user.

FIG. 10 shows the latched-locker configuration of FIG. 9, wherein the cubicle-side door 52*a* of the apparel locker 50 is being closed by the user 30. During the closing of the cubicle-side locker door 52*a*, the latch 62*a* typically pivots upwards to allow the door 52*a* to be closed. When the door 52*a* is closed, the latch 62*a* is typically re-engaged.

Optionally, the privacy latch 62*a* can be configured to automatically engage when the associated cubicle-side locker door 52*a* is moved into the closed position. The locker door 52*a* may be urged into the closed position by a spring tensioning-mechanism, and/or under the weight of the door itself. Thus it may be the default arrangement that the latch 62*a* is engaged.

Optionally, a securing device to temporarily secure the locker door 52*a* in the fully open position is provided, to increase the user's 30 ease of access to the storage cavity 54 whilst required. Afterwards, the securing device can be manually released and the cubicle-side door 52*a* of the locker 50 can be closed and locked, and the latch 62*a* re-engaged.

In embodiments, the cubicle-side door 42*a* of a wheelchair storage locker 40 comprises the aforedescribed privacy latch 62*a*. Also or alternatively, multiple storage lockers 20 may be provided with latches.

In some embodiments including a privacy latch 62*a*, the latch 62*a* comprises an indicator to convey to a user 30 whether the latch 62*a* is currently engaged or disengaged. The indicator may utilise text and/or colour and/or light e.g. an LED light which flashes in green or red depending on whether the latch is engaged or disengaged. This may offer reassurance to the user 30 that no cubicle-side locker door can be opened unexpectedly, for example by another user accessing a locker 20 from outside the cubicle 10 whilst the cubicle 10 is occupied.

Referring now to FIG. 11, there is schematically shown a sequence of operation of an example locker 150, generally similar to that of preceding figures, with similar features indicated by similar reference numerals, incremented by 100. Accordingly the locker 150 comprises a respective internal door 152*a* and external door 152*b*, the internal door 152*a* being accessible from within a cubicle (not shown in FIG. 11). FIG. 11*a* shows the locker 150 in an initial configuration. FIGS. 11*a* to 11*e* sequentially depict operation in an example chronological order. The initial configuration is a default configuration. As shown here, the door 152*b* outside the cubicle (not shown in FIG. 11) is initially locked. The door 152*b* is openable by unlocking the lock 162*b* by any user, such as by any user presenting an individual's unique RFID, or similar, to an outside locker interface 170 (e.g. on/in the external door 152*b*), whereby the single external door 152*b* becomes unlocked and openable by the individual user. As shown in FIG. 11*a*, the door 152*a* inside the cubicle is initially locked, similarly openable by unlocking the lock 162*b* by any user, such as by any user presenting an individual's unique RFID, or similar, to an inside locker interface 170 (e.g. on/in the internal door 152*a*), whereby the single internal door 152*a* becomes unlocked and openable by the individual user.

As shown in FIG. 11*a*, the locker 150 here is in a default state initially, which is an "available" state in this example. Accordingly, a user interface, such as the representative panel 172 schematically illustrated in FIG. 12, visually indicates that the locker 150 is "Available". It will be appreciated that panels 172 can be located on each side of the locker 150, such as in each respective door 152*a*, 152*b*. It will also be appreciated that each respective locker 150 can have its own respective indicator panels 172. In the example shown in FIG. 11, the initial state of the locker 150 is an "available, locked" state. Although, the locker is "available", here it must be unlocked to enable access.

It will be appreciated that, from the configuration of FIG. 11*a*, as soon as one of the doors 152*a*, 152*b* is unlocked by a presentation of a RFID tag by any user, then the other door 152*b*, 152*a* becomes unopenable in anyway: the other lock 162*b*, 162*a* cannot be operated to unlock the other door 152*b*, 152*a*. For example, even the same user who has unlocked a first door (e.g. cubicle-side door 152*a* as shown in FIG. 11*b*) would be prevented in the unlikely event that they try to unlock the other door (e.g. external door 152*b*) whilst the first door (e.g. cubicle-side door 152*a*) is still unlocked. Once a locker 150 has been unlocked from the state of FIG. 11*a* by a user's RFID tag, then the locker 150 can only be unlocked by that same user's RFID tag, for at least a period of use. Even whilst being used (locked and/or unlocked by the same user), both of the locker doors 152*a*, 152*b* cannot be in an unlocked state simultaneously.

It will be appreciated that here the locker doors 152*a*, 152*b* cannot be 'locked open'—the system will not recognise an activated latch with the door open as a "locked" door, such that the system shall still treat such a "locked-open" door as an "unlocked" door, In at least some examples, the system will not even activate or allow activation of a lock when the door 152*a*, 152*b* is not positioned with or for the lock to be properly activated to lock the door 152*a*, 152*b* closed. For example, the latch 162*a*, 162*b* may only be activatable when it can be suitably received, such as in or by a corresponding keeper.

In at least some examples, the doors 152*a*, 152*b* are each biased, such as with a respective spring mechanism pulling or forcing each door 152*a*, 152*b* shut.

In the scenario of use depicted by FIG. 11*b*, the cubicle-side door 152*a* has been unlocked from the previous configuration of FIG. 11*a* by a user in the cubicle presenting a suitable RFID wristband to an RFID interface panel 170, such as schematically depicted in FIG. 12. The locker door 152*b* outside the cubicle remains locked, even after the inside door 152*a* has been unlocked. This door 152*b* cannot be opened in any way, when the inner door 152*a* is in an unlocked state. Once one door is unlocked from one side then the other side may not be opened and the locker enters an "unlocked" state—whereby the locker is only accessible by the original user from a single door at a time. For example, as illustrated in FIG. 11*b*, if the inside door 152*a* is opened then the outside door 152*b* may not be opened and the outside door 152*b* indicates this by illuminating the "locked" indicator. The locker 150 may then be filled by the user via the inner, cubicle-side locker door 152*a*. It will be appreciated in other example methods of operation, the user may initially open the locker 150 using the external door 152*b* outside the cubicle, such that the sequence of operation may mirror that shown in FIG. 11*b* (and subsequently).

Once unlocked to the configuration of FIG. 11*b*, the inside door 152*a* can be opened and remains unlocked for a period of time to allow filling of the locker 150. In at least some examples, where the locker is associated with a sports centre, then the period of time may be determined in accordance with a corresponding minimum time for an activity, such as 20 or 30 minutes for a minimum time. Within that time period, the user is able to fill the locker 150; and lock the locker 150 by re-presenting the RFID to the interface 170 in the locker door 152*a*. In at least some examples, the period of time is predetermined, such as to reflect a typical or reasonable minimum time for performing an associated activity. The associated activity may comprise a maximum reasonable time for a user to change their clothing and fill the locker 150. For example, where a user's first action on entering a cubicle is to unlock a locker 150, then the period of time may allow for the user to subsequently disrobe, put on other clothing and fill the locker 150 with the items they wish to store. The period of time and/or locker status of FIG. 11*b* may account for a user opening a first locker, then changing their mind and moving or putting their belongings into a second, different locker only. In the example shown here, the locker 150 may be transitioned from the "unlocked" configuration of FIG. 11*b* to a locked configuration (e.g. of FIG. 11*c*) by a presentation of any RFID tag to the locker's 150 interface 170—not necessarily the same RFID tag that was used to unlock the locker 150 from the configuration of FIG. 11*a*. In other examples, only the same RFID tag that was used to unlock the locker 150 from the configuration of FIG. 11*a* can be used to lock the locker 150 (e.g. after that same user has filled the locker with the items they wish to store in the locker 150).

The locker 150 does not remain in the "unlocked" state of FIG. 11*b* indefinitely. For example if a user opened that locker 150 and then changed their mind to use a different locker 150 the original locker 150 could be stuck oriented to the insider side of the cubicle. To prevent that, the locker 150 here is configured with a "timeout" such that the locker reverts back to the initial state (of FIG. 11*a*) after a predetermined time. The timing would be set to be the longest that it can be while still maintaining an availability of lockers 150 on/from each side of the cubicle. In this example, the timing to revert to the initial state would be at least 30 mins in order to ensure that a cubicle occupant was not simply taking a while to fill their locker.

In at least some examples, the system may allow a single user to utilise multiple lockers simultaneously. For example, a user's RFID tag may be used to provide simultaneous use of a wheelchair locker (e.g. locker 40 of previous figures) and a smaller locker 150. In some examples, the system may enable a user to utilise an unlimited number of lockers 150. In other examples, the system may be configured to limit a user's simultaneous use to a limited number of lockers. The limited number of lockers simultaneously usable by a user and/or RFID tag may be three or less, such as a single locker.

Referring to FIG. 11*c*, it can be seen that the user can open the inner, cubicle-side door 152*a* only. The doors 152*a*, 152*b* here can be biased closed (e.g. by a spring, not shown), such that the user must pull the door 152*a* open to access the cavity within the locker 150. In other examples, only one of the inner or outer locker doors 152*a*, 152*b* is biased closed. In at least some examples, at least one of the locker doors 152*a*, 152*b* is biased open (when unlocked). Accordingly, an absence of any open doors 152*a* can reassure a user that all of the locker doors (at least on one side, such as inside the cubicle) are locked.

Once the user has placed all of their items within the locker 150, the door 152*a* inside cubicle is locked with the RFID tag (e.g. wristband). The user's personal items remain located in the locker 150, as shown in FIG. 11*d*, where the locker is in a "locked unavailable" state. The user can leave the cubicle and area of the locker 150, such as to perform their desired activities. Upon completing their activities, the user can return to the same locker 150 to retrieve their personal items. Either door 152*a*, 152*b* of the locker 150 may be unlocked by the same RFID tag as used to lock the locker 150 from the configuration of FIG. 11*c* to the configuration of FIG. 11*d*. For example, if the user is able to access the same cubicle (e.g. if same cubicle is not occupied by another user), then the user can use the same cubicle and access the locker 150 again via the same, inner cubicle-side door 152*a*. Alternatively, if the user cannot access the same cubicle (or does not wish to use a cubicle, e.g. if changing clothes again is not required), then the user can choose to access the locker 150 via the outside locker door 152*b*. As always, only a single locker door: either the inner, cubicle-side door 152*a* or external door 152*b* can be in an unlocked state at any time.

In this example, the locker 150 has three states, such as experienced by users. Accordingly, the indicator 172 has three corresponding options for indication. In at least some examples, the indicator may comprise a light/s and/or a symbol for communicating the different states. For example, a green light and corresponding symbol (or text) may indicate the initial "(locked), Available" state; an orange light and corresponding symbol (or text) may indicate the second "unlocked" state when a user has accessed the locker 150 initially with their RFID tag; and a red light and corresponding symbol (or text) to indicate the third "Locked, Unavailable" state.

In this example system, there is provided a RFID tag transducer for toggling the relevant door 152*a*, 152*b* between locked and unlocked states. The locks 162*a*, 162*b* on doors 152*a*, 152*b* on each side of the locker 150 have a common control system. The lockers 150 are each connected to a central control system. Here, the doors' 152*a*, 152*b* self-closing biasing mechanism assists in automatically changing the state of the doors, such as when the predetermined time period lapses.

Referring now to FIG. 13, there is shown a sequence of an alternative operation of a locker 150 in chronological order from 13*a* to 13*e*. The locker 150 as shown in FIG. 13*a* is generally in a similar state as that shown in FIG. 11*a*. However, here, in the default initial state, the locker 150 in the "available" state is not fully locked. Rather, one, and only one, of the locker doors 152*a*, 152*b* is unlocked and the other of the locker doors 152*b*, 152*a* is locked. As shown here, the inner lock 162 is disengaged such that the inner, cubicle-side door 152*a* is unlocked and accessible, from within the cubicle. As shown in FIG. 13*a*, the outer locker door 152*b* has its lock 162*b* engaged, such that the outer locker door 152*b* cannot be opened, not even with a presentation of a RFID tag to the interface panel 170 of the locker 150 (such as per FIG. 12). In this alternative arrangement, the locker can only be accessed from one, single side when the locker is empty and available. Accordingly, a management system can be used to direct users towards a preferred side of use. For example, the single side of access may be the cubicle-side initially—such as based upon an assumption that all users initially shall wish to utilise a cubicle. Accordingly, all lockers can be initially 'programmed' to provide access from the cubicle (as shown as the example in FIG. 13*b*).

Figure 13A:
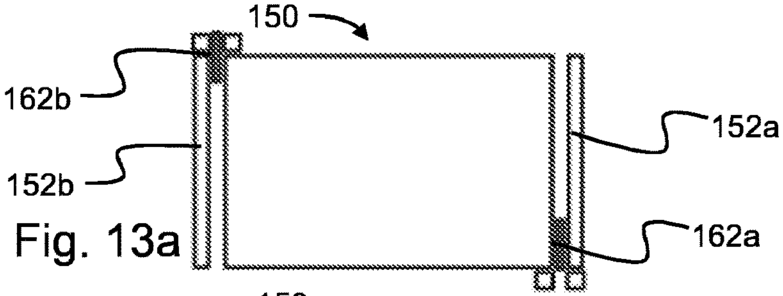
FIGS. 13*a* to 13*e* show a sequence of an alternative operation of the locker of FIGS. 11*a* to 11*e* in chronological order.
Figure 13B:
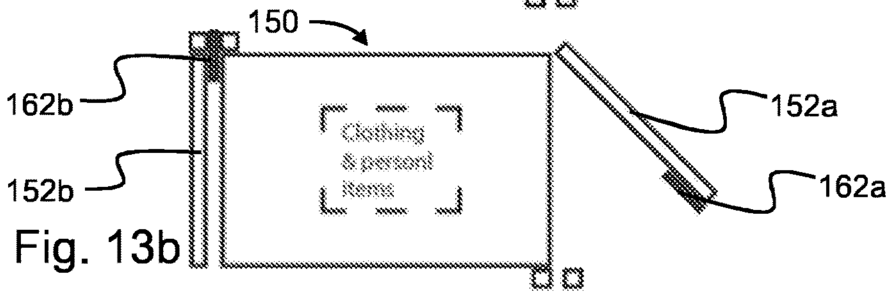
Figure 13C:
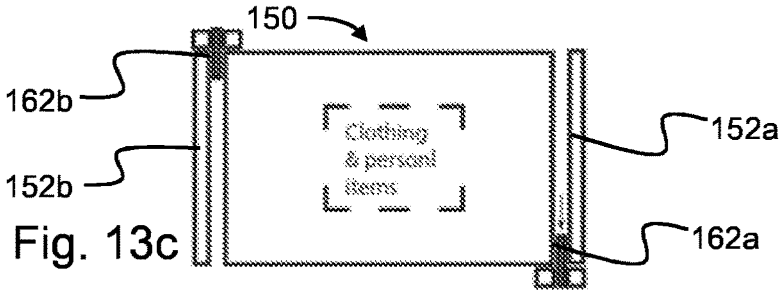
Figure 13D:
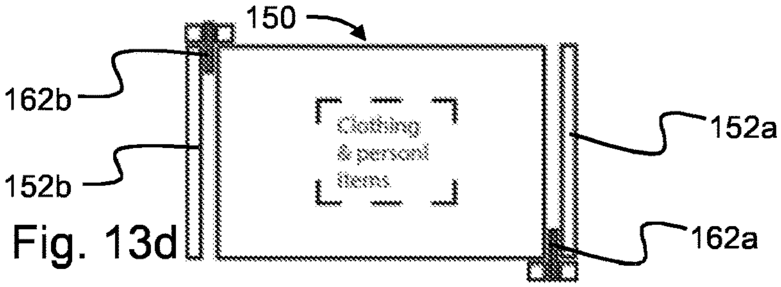
Figure 13E:
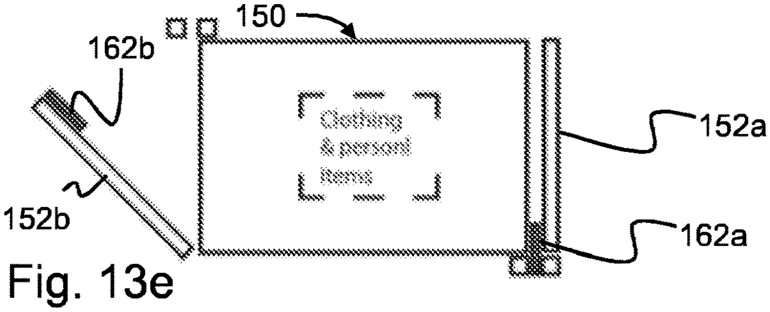
Figure 14:
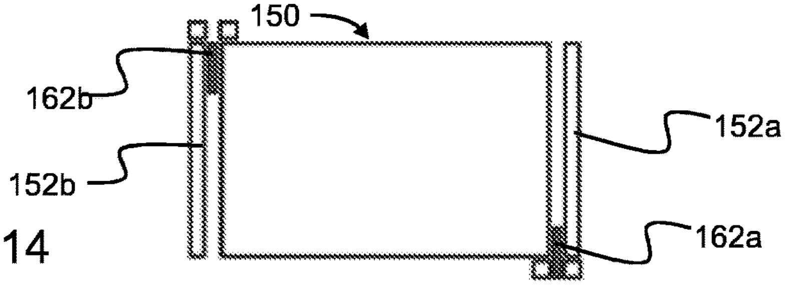
FIG. 14 shows the locker of FIG. 13*a* in an alternate initial state.

With the locker 150 unlocked and openable (from one side only), a user can open the locker door 152*a* and insert their items for storage, as depicted in FIG. 13*b*. Thereafter, presentation of a RFID to the locker interface 170 in the locker door 152*a* transitions the corresponding lock 162*a* to a locked configuration, as shown in FIG. 13*c*. In the locked, occupied configuration of FIG. 13*d*, the user can leave the cubicle and locker area to perform their desired activity. When a user wishes to access their items, they can choose which side of the locker 150 to access—such as in dependence on availability of the same cubicle (from which the locker 150 is accessible via the inner door 152*a*). As shown here in FIG. 13*e*, the user has accessed the locker 150 via the external locker door 152*b*. Use of the locker 150 by this user is now complete, with the locker 150 now in a state of "available", similar to the original initial state. As shown in this example here, the initial state of the locker 150 is not identical: after use by the first user, the "available" configuration of the locker 150 now has the locker being accessible only from outside the cubicle, via the external locker door 152*b*, as exemplified in FIG. 14. It will be appreciated that there may be a transition in the "available" states of lockers, with the one of the doors 152*a*, 152*b* that is initially accessible transferring from one side of the locker to the other—in dependence on each user's preference or last use of the locker 150. A management system and/or a 'timeout' may be used to vary which door is open in the "available" state. For example, over a period of time, a number of lockers may have their default "available" states changed such that accessibility is switched from one side of the locker (e.g. outside the cubicle) to the other (e.g. inside the cubicle). Accordingly, locker access can be actively managed, such as throughout or during different times of the day or general use: with the default initial state being selected between FIG. 14 and FIG. 13*a*.

As per previously, the locker doors 152*a*, 152*b* are each biased closed. Accordingly, the state of the doors can be automatically changed. For example, the central control system may change the state of a locker door after the lapse of the predetermined time period (e.g. 30 minutes) and/or after or upon a particular event. For example, at the end and/or start of each day, the central control system may change the state of every locker to a preferred default initial state.

It should be appreciated that the provision of a locker with only two possible conditions from a user perspective (e.g. locked and unlocked/available) may provide improved usability. For example, users, particularly users with a disability or anxiety who could be potentially be more deterred from visiting a facility, may feel more comfortable or adapt more quickly to such a system that may more closely resemble an interface or operation of at least a locker door. For example prior art systems where locker doors are typically only toggled between locked and unlocked may be more familiar for users where at least some examples of lockers 150 here at least have such an appearance of only being locked or unlocked—albeit some of the apparently "locked" lockers 150 may be accessible from the other side (unbeknown to the user).

In at least some examples, the locker may be provided with a sensor/s. The sensor/s may be to at least assist in determining a state or condition of the locker. The state or condition of the locker may be related to a presence of a user's items in the locker. For example, the locker may comprise a sensor/s for detecting the presence of a user's items, such as with optical and/or mechanical sensors. In at least some examples, the locker has a force sensor such as to detect a weight of items located in the locker cavity by a user. The sensor/s may be configured to provide an input to a management system, such as to assist in determining and/or defining a locker state or configuration. For example, an indication from a sensor of a lack of user items in a locker may allow the management system to change a state of a locker 150 to "available", such as after a predetermined period of time and/or with an override (e.g. manual).

It will be appreciated that although not shown here, the lockers can have identifiers, such as numbers applied. Accordingly, each locker door for the same locker can have the same identifier making it straightforward for users to access the locker from either side.

Although the above-described embodiments relate to an aquatic sports facility with wet and dry changing areas, the inventive changing area storage locker(s) could be provided in alternative locations. At least one storage locker could be disposed in a sports centre or gymnasium, or another venue with sports and/or leisure facilities/equipment such as a school or a spa. In any location provided with at least one storage locker, the first and second locker doors may be provided in distinct areas, only one of these areas being inhabitable by any one user at a single instant. The first and second doors could be provided in first and second changing cubicles, and/or first and second changing areas.

In embodiments, a single locker may be configured to store apparel and/or one or more wheelchairs and/or (an) other item(s).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present invention may consist of any such individual feature or combination of features, except combinations where at least some of such features and/or steps are mutually exclusive. It should be understood that the embodiments described herein are merely exemplary and that various modifications may be made thereto without departing from the scope or spirit of the invention. For example, it will be appreciated that any number of the aforedescribed changing area storage lockers can be provided at a given location, including one locker, or at least two or more (e.g. five lockers).

The invention claimed is:

1. An aquatic sports facility changing facility comprising a first plurality of changing area storage lockers and a first changing area comprising a changing cubicle having a main cubicle door, wherein the first plurality of the changing area storage lockers at least partially define a boundary of the changing cubicle, each of the changing area storage lockers comprising:

at least a first door and a second door, wherein the first door is accessible from within the changing cubicle, and the second door is accessible from a second changing area outside the changing cubicle;

a storage cavity for storing a user's apparel, the storage cavity being accessible via the first door or the second door; and at least one locking system for selectively locking one or both of the first and second doors such that the storage cavity is accessible via only a single one of the first and second doors at any time;

wherein the locking system comprises a discrete electronic interface associated with each storage locker and is configured to prohibit access to the storage cavity via the first and second doors simultaneously, including prohibiting simultaneous access to the same changing area storage locker via both the first and second doors by a single user;

wherein each storage locker comprises a visual indicator to visually indicate to a user in the changing cubicle whether at least one of the storage locker doors is unlocked; and wherein, in use, a user's stored apparel is accessible via either one of the first or second doors when they are unlocked.

2. The aquatic sports facility changing facility as claimed in claim 1, wherein the storage cavity is accessible via either of the first or second doors when they are unlocked, and securable via one or both of the first and second doors when they are locked; and wherein the locking system operates such that if the first door is unlocked, the second door is or remains locked; and if the second door is unlocked, the first door is or remains locked.

3. The aquatic sports facility changing facility as claimed in claim 1, wherein the locking system is configured to selectively vary the first and second doors between three respective states, wherein:

i. both the first and second doors are locked;

ii. the first door is unlocked and the second door is locked; or iii. the first door is locked and the second door is unlocked; and wherein the states are variable in any order.

4. The aquatic sports facility changing facility as claimed in claim 1, wherein the first door, when open, provides access to the storage cavity via a first opening; and the second door, when open, provides access to the storage cavity via a second opening; and wherein the first opening is discrete from the second opening.

5. The aquatic sports facility changing facility as claimed in claim 1, wherein the changing area storage locker is configured to prevent viewing into the changing area storage locker when the first and second doors are closed.

6. The aquatic sports facility changing facility as claimed in claim 1, wherein the changing area storage locker is configured to prevent viewing through the changing area storage locker, thereby preventing viewing into the first changing area, when one of the first and second doors is opened.

7. The aquatic sports facility changing facility as claimed in claim 1, wherein the locking system is configured to operate to individually lock or unlock each of the first and second doors.

8. The aquatic sports facility changing facility as claimed in claim 1, wherein at least one of the changing area storage lockers is a wheelchair locker for storing a wheelchair.

9. The aquatic sports facility changing facility as claimed in claim 8, wherein the storage cavity of the wheelchair locker has a width greater than a width of at least one other of the changing area storage lockers and sized to receive the wheelchair in an assembled configuration.

10. The aquatic sports facility changing facility as claimed in claim 1, wherein the at least one locking system comprises a first locking system and a second locking system, and wherein the first locking system operates to lock or unlock the first door, and the second locking system operates to lock or unlock the second door.

11. The aquatic sports facility changing facility as claimed in claim 1, wherein the first and second doors are arranged such that they substantially directly oppose each other.

12. The aquatic sports facility changing facility as claimed in claim 1, further comprising a divider between the first and second doors.

13. The aquatic sports facility changing facility as claimed in claim 1, comprising an array of the changing area storage lockers, wherein the array is configured to visually indicate whether any of the plurality of first doors and/or any of the plurality of the second doors is or can be unlocked, at least one of the pluralities of first or second doors facing in a similar orientation towards a same changing area.

14. The aquatic sports facility changing facility as claimed in claim 1, wherein the changing cubicle is a dry changing area and the second changing area is a wet changing area.

15. The aquatic sports facility changing facility as claimed in claim 1, further comprising:

a second changing cubicle having a main cubicle door;

a second plurality of the changing area storage lockers at least partially defining a boundary of the second changing cubicle;

a first interior wall at least partially defining a boundary between the changing cubicle and the second changing cubicle.

16. The aquatic sports facility changing facility as claimed in claim 15, further comprising:

a third changing cubicle having a main cubicle door;

a third plurality of the changing area storage lockers at least partially defining a boundary of the third changing cubicle;

a second interior wall at least partially defining a boundary between the second changing cubicle and the third changing cubicle.

17. The aquatic sports facility changing facility as claimed in claim 16, further comprising a third interior wall at least partially defining a boundary between the changing cubicle and the third changing cubicle.

18. The aquatic sports facility changing facility as claimed in claim 16, wherein the visual indicator on each storage locker is one of a light, text, or color indicating that the at least one locking system is engaged or disengaged.

* * * * *